United States Patent
Kato

(10) Patent No.: US 12,494,537 B2
(45) Date of Patent: Dec. 9, 2025

(54) BATTERY MODULE

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 696 days.

(21) Appl. No.: 17/702,387

(22) Filed: Mar. 23, 2022

(65) Prior Publication Data
US 2022/0320652 A1    Oct. 6, 2022

(30) Foreign Application Priority Data

Mar. 31, 2021  (JP) ................ 2021-060581

(51) Int. Cl.
*H01M 50/207* (2021.01)
*B60K 1/04* (2019.01)
*H01M 10/613* (2014.01)
*H01M 50/271* (2021.01)

(52) U.S. Cl.
CPC ......... *H01M 50/207* (2021.01); *B60K 1/04* (2013.01); *H01M 10/613* (2015.04); *H01M 50/271* (2021.01); *H01M 2220/20* (2013.01)

(58) Field of Classification Search
CPC ............ H01M 50/207; H01M 10/613; H01M 50/271; H01M 2220/20; B60K 1/04; B60L 50/50; H01N 2220/20
See application file for complete search history.

(56) References Cited

U.S. PATENT DOCUMENTS

| | | | | |
|---|---|---|---|---|
| 2016/0121752 A1* | 5/2016 | Takeyama | ........... | H01M 8/2483 |
| | | | | 180/68.5 |
| 2020/0287183 A1* | 9/2020 | Matsumoto | ............. | B60K 1/04 |
| 2023/0187728 A1* | 6/2023 | Jang | ................. | H01M 10/6568 |
| | | | | 429/120 |

FOREIGN PATENT DOCUMENTS

| | | | | |
|---|---|---|---|---|
| CN | 111149236 A | 5/2020 | | |
| CN | 112397843 A | 2/2021 | | |
| DE | 102019120606 A1 * | 2/2021 | .......... | H01M 10/613 |
| JP | 1-113438 U | 7/1989 | | |
| JP | 6-349463 A | 12/1994 | | |
| JP | 2019-081435 A | 5/2019 | | |

OTHER PUBLICATIONS

English Translation of Office Action issued Jun. 27, 2023 in Japanese Application No. 2021-060581.

* cited by examiner

*Primary Examiner* — Jonathan G Leong
*Assistant Examiner* — Everett T Choi
(74) *Attorney, Agent, or Firm* — Sughrue Mion, PLLC

(57) ABSTRACT

A battery module includes a secondary battery and a case accommodating the secondary battery. The case has a case body that is open downward, and a cover member covering an opening of the case body. The cover member has a support that supports the secondary battery above a lower end portion of the case body, and an opposing portion extending downward from an edge of the support, the opposing portion opposing the lower end portion of the case body. The opposing portion is secured to the lower end portion of the case body.

3 Claims, 4 Drawing Sheets

BATTERY MODULE

This nonprovisional application is based on Japanese Patent Application No. 2021-060581 filed on Mar. 31, 2021, the entire content of which is hereby incorporated by reference.

BACKGROUND

Field

The present disclosure relates to a battery module.

Description of the Background Art

For example, Japanese Patent Laying-Open No. 2019-81435 discloses a battery pack structure including: a tray disposed below the floor panel of a vehicle; and a battery module mounted on the tray.

SUMMARY

With the structure disclosed in Japanese Patent Laying-Open No. 2019-81435, the battery module may be damaged if the upward impact acts on the tray, which is caused by pushing up from below the vehicle.

An object of the present disclosure is to provide a battery module which suppresses damage to the secondary battery caused by pushing up from below the vehicle.

A battery module according to one aspect of the present disclosure includes: a secondary battery; and a case accommodating the secondary battery, wherein the case having: a case body that is open downward; and a cover member covering an opening of the case body, the cover member having: a support that supports the secondary battery above a lower end portion of the case body; and an opposing portion extending downward from an edge of the support, the opposing portion opposing the lower end portion of the case body, wherein the opposing portion is secured to the lower end portion of the case body.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
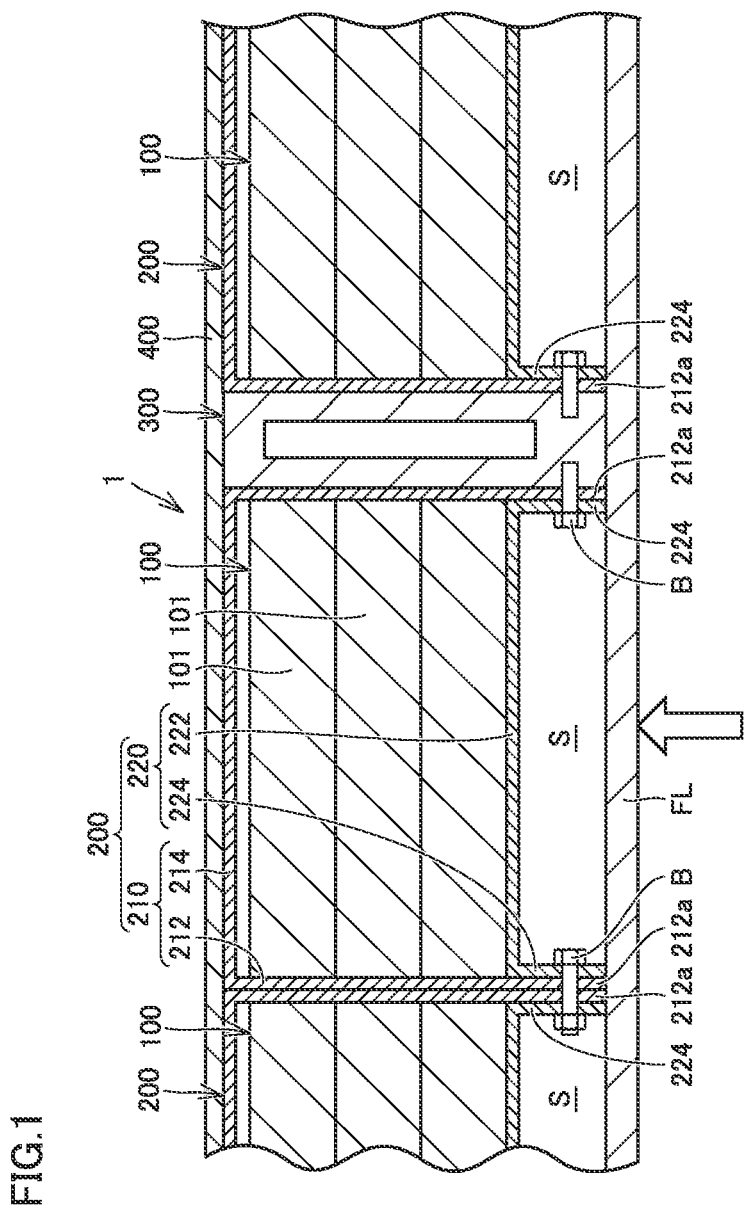
FIG. 1 is a cross-sectional view schematically showing a configuration of a battery module according to one embodiment of the present disclosure.

Embodiments according to the present disclosure will be described, with reference to the accompanying drawings. Referring now to the drawings wherein like numerals are used to refer to like or corresponding members.

FIG. 1 is a perspective view schematically showing a configuration of a battery module according to one embodiment of the present disclosure. The battery module 1 is mounted on the floor of a vehicle, for example.

As shown in FIG. 1, the battery module 1 includes a cell stack 100 and a case 200.

The cell stack 100 includes at least one secondary battery 101. In the present embodiment, the cell stack 100 has multiple secondary batteries 101. The secondary batteries 101 are stacked in one direction. Examples of the secondary battery 101 include lithium-ion batteries. While FIG. 1 shows an example in which one cell stack 100 has three secondary batteries 101, it should be noted that the number of secondary batteries 101 included in one cell stack 100 is not particularly limited.

The case 200 accommodates the cell stack 100. The case 200 is placed on a floor FL of the vehicle, for example. The case 200 may be formed of a metal or the like. The case 200 has a case body 210 and a cover member 220.

The case body 210 is open downward. The case body 210 has a surrounding wall 212 and an upper wall 214.

The surrounding wall 212 surrounds the cell stack 100. The surrounding wall 212 is formed in a hollow rectangular cylindrical shape. The surrounding wall 212 has a lower end portion 212a. In the present embodiment, the lower end portion 212a provides an abutting member that abuts the floor FL.

The upper wall 214 is connected to the upper end portion of the surrounding wall 212. The upper wall 214 is formed in a rectangular shape, covering the upper opening of the surrounding wall 212.

The cover member 220 covers the opening of the case body 210 (the lower opening of the surrounding wall 212). The cover member 220 supports the cell stack 100 so that the space S is formed between the floor FL and the cell stack 100 as the case body 210 is placed on the floor FL. The cover member 220 has a support 222 and an opposing portion 224.

The support 222 supports the cell stack 100 above the lower end portion 212a. The support 222 has a shape that covers the opening of the case body 210. In the present embodiment, the support 222 is formed in a rectangular shape. The support 222 may be formed flat. A space S is formed between the support 222 and the floor FL.

The opposing portion 224 extends downward from an edge of the support 222, and is opposite the lower end portion 212a. The opposing portion 224 is formed in a rectangular cylindrical shape that fits inside the surrounding wall 212. The opposing portion 224 is disposed inside the lower end portion 212a. Preferably, the opposing portion 224 has an outer surface in contact with the inner surface of the lower end portion 212a. The opposing portion 224 is secured to the lower end portion 212a by a fastener member B.

As shown in FIG. 1, the battery module 1 may further include a cooling device 300. The cooling device 300 is capable of passing a cooling medium (such as water) therethrough. The cooling device 300 is disposed in contact with the outer surface of the surrounding wall 212. The cooling device 300 may be disposed between adjacent cases 200. In this case, the opposing portion 224 may be secured to the cooling device 300 by the fastener member B.

The battery module 1 may further include a top plate 400. The top plate 400 is connected to the upper surface of the case 200. In this case, a unit that includes the top plate 400 is mounted on the floor FL.

As described above, according to the battery module 1 of the present embodiment, since the support 222 supports the cell stack 100 above the lower end portion 212a, the space S is formed between the cell stack 100 and the floor FL when the battery module 1 is placed on the floor FL. Due to this, even if the floor FL is impacted by pushing up from below the vehicle as indicated by the arrow in FIG. 1, the thrust load is suppressed from being conveyed to respective secondary batteries 101 in the cell stack 100. Thus, damage to the secondary battery 101 caused by pushing up from below the vehicle is suppressed. In addition, the space S being formed, facilitates securing the cover member 220 to the case body 210.

In other words, the space S has a function as a workspace for securing the opposing portion 224 to the lower end portion 212a and a function for avoiding damage to the secondary battery 101 caused by pushing up from below the vehicle. Due to this, the percentage of the cell stack 100 occupying the battery module 1 can be increased, as compared to providing a dedicated space for each of the functions within the battery module 1.

Note that, in the embodiment described above, the cooling device 300 may be disposed in contact with both sides of each case body 210.

Figure 2:
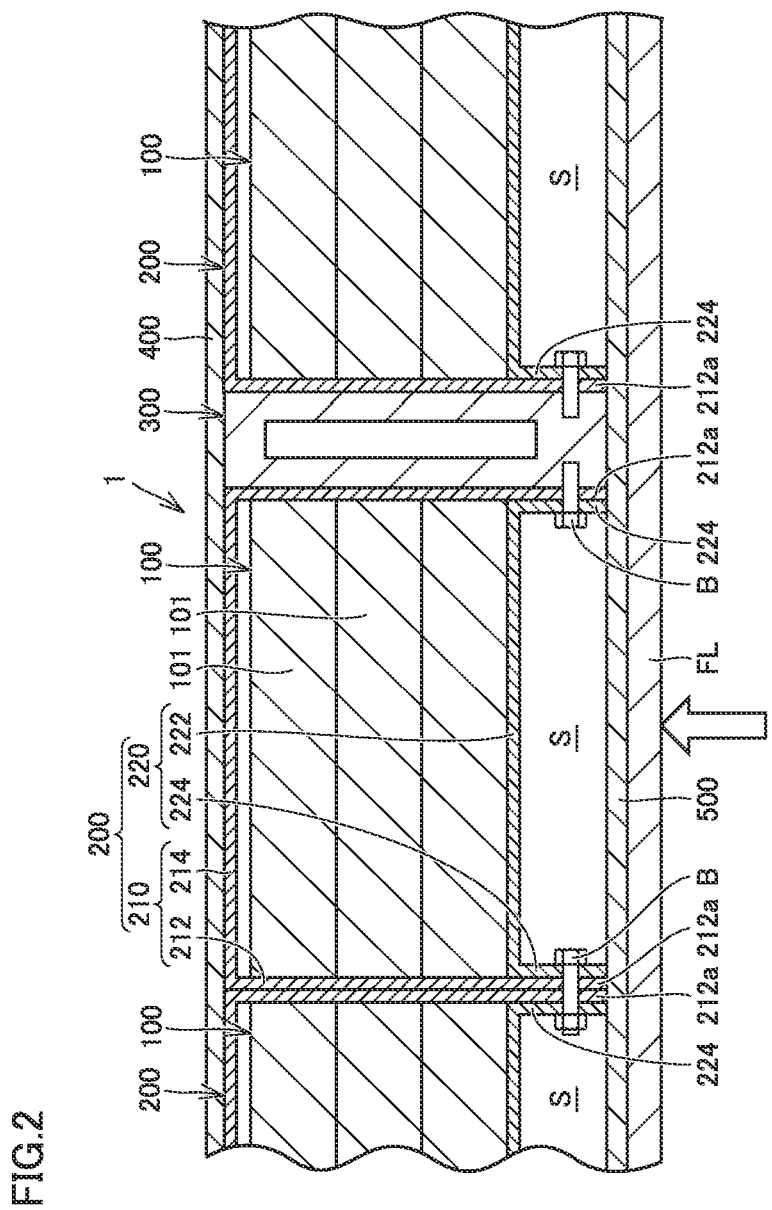
FIG. 2 is a cross-sectional view schematically showing a configuration of a variation of the battery module.

The battery module 1 may further include a bottom plate 500, as shown in FIG. 2. The bottom plate 500 is connected to the undersurface of the case 200. In this case, a unit, including the top plate 400 and the bottom plate 500, is mounted on the floor FL.

Figure 3:
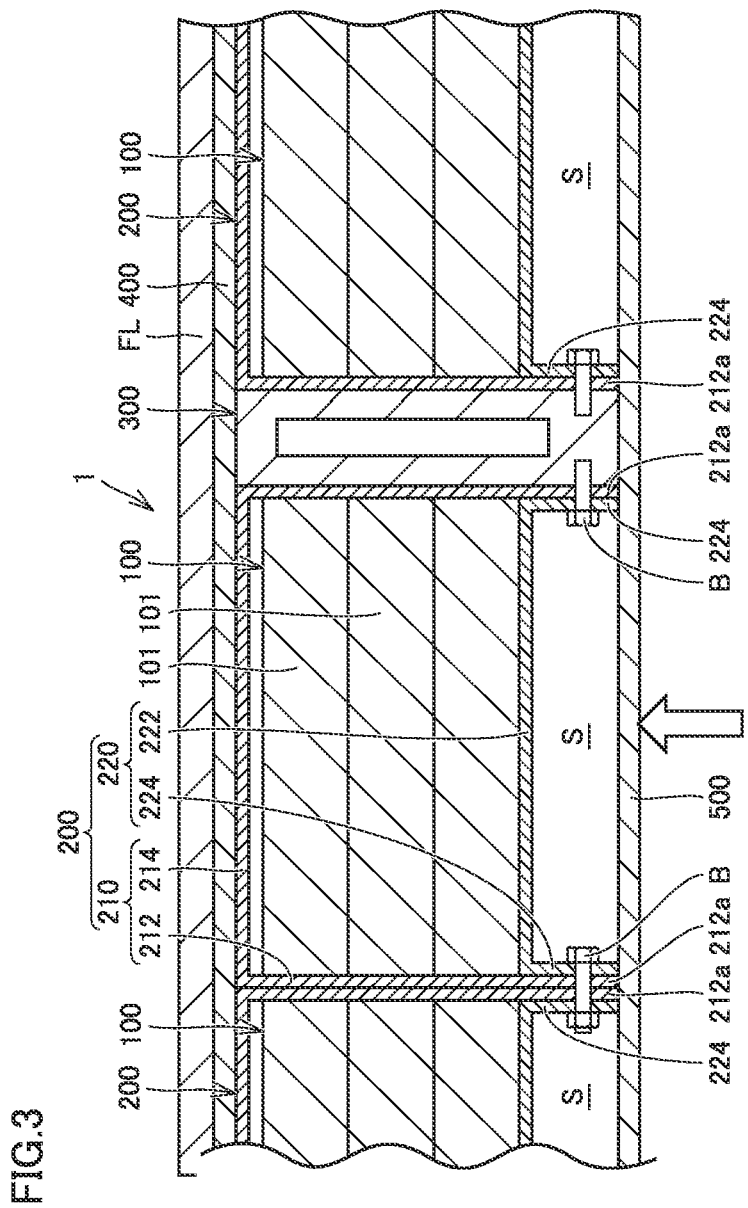
FIG. 3 is a cross-sectional view schematically showing a configuration of a variation of the battery module.
Figure 4:
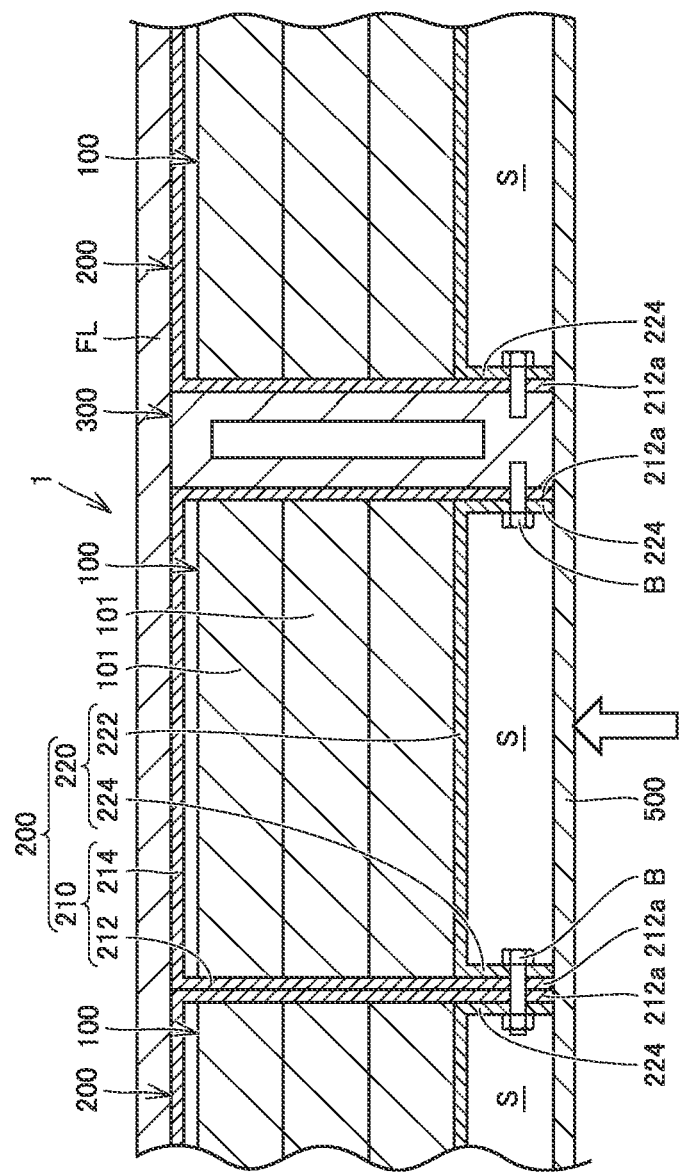
FIG. 4 is a cross-sectional view schematically showing a configuration of a variation of the battery module.

This unit, including the top plate 400 and the bottom plate 500, may be connected to the undersurface of the floor FL, as shown in FIG. 3. If the battery module 1 is connected to the undersurface of the floor FL, as shown in FIG. 4, the top plate 400 may be omitted. In the examples shown in FIGS. 3 and 4, the space S is formed between the cell stack 100 and the bottom plate 500. Due to this, even if the bottom plate 500 is impacted by pushing up from below the vehicle, the thrust load is suppressed from being conveyed to respective secondary batteries 101 in the cell stack 100, similarly to the embodiment shown in FIG. 1.

A person skilled in the art would understand that the exemplary embodiments described above are specific examples of the following aspects.

The battery module according to the embodiments above includes: a secondary battery; and a case accommodating the secondary battery, wherein the case having: a case body that is open downward; and a cover member covering an opening of the case body, the cover member having: a support that supports the secondary battery above a lower end portion of the case body; and an opposing portion extending downward from an edge of the support, the opposing portion opposing the lower end portion of the case body, wherein the opposing portion is secured to the lower end portion of the case body.

According to the battery module, since the support of the cover member supports the secondary battery above the lower end portion of the case body, when the battery module is placed on, for example, a floor of the vehicle, a space is formed between the secondary battery and the floor. Due to this, even if the floor is impacted by pushing up from below the vehicle, the thrust load is suppressed from being conveyed to the secondary battery. Thus, damage to the secondary battery, caused by pushing up from below the vehicle is suppressed. In addition, the space being formed facilitates securing the cover member to the case body.

The battery module may further include the cooling device disposed adjacent to the case body, and the lower end portion of the case may be secured to the cooling device.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery module, comprising:
a cell stack including a plurality of secondary batteries stacked in a first direction;
a case accommodating the cell stack;
a cooling device disposed in contact with the case;
a fastening member that secures the cooling device to the case; and
a top plate connected to an upper surface of the case with respect to the first direction, wherein
the case having:
a case body that is open downward with respect to the first direction; and
a cover member covering an opening of the case body, the case body having:
a surrounding wall surrounding the cell stack; and
an upper wall connected to an upper end portion of the surrounding wall with respect to the first direction, the cover member having:
a support that supports the cell stack above a lower end portion of the surrounding wall with respect to the first direction; and
an opposing portion extending downward with respect to the first direction from an edge of the support, the opposing portion opposing the lower end portion of the surrounding wall, wherein
the cooling device is disposed in contact with an outer surface of the surrounding wall,
the top plate covers an upper surface of the upper wall with respect to the first direction and an upper surface of the cooling device with respect to the first direction,
a length of the cooling device in the first direction is greater than a length of the cell stack in the first direction, and
the fastening member secures the opposing portion and the lower end portion of the surrounding wall to the cooling device.

2. The battery module according to claim 1, wherein the opposing portion is disposed inside the lower end portion of the surrounding wall.

3. The battery module according to claim 2, wherein an outer surface of the opposing portion is in contact with an inner surface of the lower end portion of the surrounding wall.

* * * * *